United States Patent
Noguchi et al.

(10) Patent No.: US 6,290,322 B1
(45) Date of Patent: Sep. 18, 2001

(54) IMAGE RECORDING METHOD AND APPARATUS

(75) Inventors: Hiroyuki Noguchi; Hiroshi Nobuta, both of Yokohama; Hisayoshi Matsui, Nagoya; Fumihiko Nakamura, Tokyo, all of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 08/855,283

(22) Filed: May 13, 1997

Related U.S. Application Data

(63) Continuation of application No. 08/301,423, filed on Sep. 9, 1994, now abandoned.

(30) Foreign Application Priority Data

Sep. 10, 1993 (JP) .................................................. 5-226199
Sep. 1, 1994 (JP) .................................................. 6-208651

(51) Int. Cl.[7] .............................. B41J 2/165; H04N 1/21
(52) U.S. Cl. .............................. 347/23; 358/296; 347/29; 347/35
(58) Field of Search ................................ 347/23, 24, 30, 347/35, 43, 3, 18, 57; 358/502, 296

(56) References Cited

U.S. PATENT DOCUMENTS

| | | | |
|---|---|---|---|
| 4,313,124 | 1/1982 | Hara | 347/57 |
| 4,345,262 | 8/1982 | Shirato et al. | 347/10 |
| 4,459,600 | 7/1984 | Sato et al. | 347/47 |
| 4,463,359 | 7/1984 | Ayata et al. | 347/56 |
| 4,510,510 | 4/1985 | Terasawa | 347/30 |
| 4,558,333 | 12/1985 | Sugitani et al. | 347/65 |
| 4,608,577 | 8/1986 | Hori | 347/66 |
| 4,723,129 | 2/1988 | Endo et al. | 347/56 |
| 4,740,796 | 4/1988 | Endo et al. | 347/56 |
| 4,745,414 | 5/1988 | Okamura et al. | 347/30 |
| 5,018,884 | * 5/1991 | Hirano et al. | 400/126 |
| 5,109,233 | 4/1992 | Nishikawa | 347/35 X |
| 5,128,690 | 7/1992 | Nozawa | 347/30 |
| 5,172,140 | * 12/1992 | Hirabayashi et al. | 347/23 X |
| 5,220,417 | * 6/1993 | Sugiura | 358/75 |
| 5,357,347 | * 10/1994 | Hirose et al. | 358/296 |
| 5,483,358 | * 1/1996 | Sugiura et al. | 358/426 X |
| 5,486,849 | * 1/1996 | Miura et al. | 347/18 |
| 5,495,271 | * 2/1996 | Koitabashi et al. | 347/23 |
| 5,561,536 | * 10/1996 | Sugiura et al. | 358/539 X |
| 5,604,598 | * 2/1997 | Shigemura | 358/296 |
| 5,721,620 | * 2/1998 | Arai et al. | 358/296 |
| 5,760,795 | * 6/1998 | Beck | 347/3 |
| 5,835,115 | * 11/1998 | Kitazawa | 347/57 |

FOREIGN PATENT DOCUMENTS

| | | | |
|---|---|---|---|
| 0 525 988 | * 2/1993 | (EP) | B41J/2/165 |
| 54-056847 | 5/1979 | (JP) . | |
| 59-123670 | 7/1984 | (JP) . | |
| 59-138461 | 8/1984 | (JP) . | |
| 60-071260 | 4/1985 | (JP) . | |
| 63-252748 | * 10/1988 | (JP) | 347/23 |

* cited by examiner

Primary Examiner—N. Le
Assistant Examiner—Shih-Wen Hsieh
(74) Attorney, Agent, or Firm—Fitzpatrick, Cella, Harper & Scinto

(57) ABSTRACT

A recording apparatus which reduces consumption of ink by preventing unnecessary recovery operation during a printing job by an ink-jet method. First, the recording apparatus detects whether a recording mode is a black and white printing mode or color printing mode. Second, if the printing mode is the black and white printing mode, then the image recording is performed by using only nozzles for K(black), as well as an idle discharge operation is performed only on the nozzles for K. Whereas if the color printing mode is detected, then the image recording is performed by using all the nozzles for C(cyan), M(magenta), Y(yellow), and K(black), as well as the idle discharge operation is performed on all the nozzles.

21 Claims, 9 Drawing Sheets

IMAGE RECORDING METHOD AND APPARATUS

This application is a continuation of application Ser. No. 08/301,423 filed Sep. 9, 1994 now abandoned.

BACKGROUND OF THE INVENTION

The present invention relates to an image recording method and apparatus and, more particularly, to a facsimile apparatus applying an image recording method and apparatus capable of recording a color image.

The demand for a facsimile which is capable of communicating color image information is increasing, and a printer adopting an ink-jet method is available as a method to record color image information. The printer adopting the ink-jet method prints by discharging ink onto recording medium such as a recording paper sheet. One of the methods to discharge ink is to set a thermal electrode (heater) on a nozzle, and discharge ink by producing bubbles of ink at the thermal electrode.

Regarding an ink-jet printer capable of color recording, ink of four colors, that is cyan(C), magenta(M), yellow(Y), and black(K), is commonly used. Thus nozzles for ink of four colors are needed, and various colors are able to be expressed by controlling the discharging amount of the ink of each color.

An ink-jet printer, such as the one explained above, performs a so-called recovery operation in order to prevent holes of the nozzles from being stuffed and to stabilize the discharging amount of ink. Regarding the recovery operation, there are available several kinds of methods, such as an idle discharge operation which is performed at a certain interval of time (for stabilizing condition of nozzles by discharging ink on an area for receiving the discharged ink, not on an area for recording), and suction recovery (for stabilizing condition of nozzles by sucking ink out of the nozzles regularly, thereby preventing the nozzles from drying). Generally, the idle discharge operation is performed at a predetermined period during a recording operation. Further, the suction recovery is performed during a recording operation and stand-by status (the printer is on, but not currently recording) at a predetermined interval, for instance, once every 72 hours.

A color facsimile can be constructed by employing the aforementioned ink-jet color printer as a recording device of the facsimile. However, when color facsimiles in use in a facsimile market are considered, only K(black) ink seems to be used mostly since black and white information is mainly interchanged.

In a case where the color facsimile is used, in spite of using only K(black) ink, the idle discharge operation and the suction recovery are also performed on the nozzles for C(cyan), M(magenta), and Y(yellow). Regarding the consumed amount of ink, since the suction recovery is for preventing the nozzle from drying and so on, and is performed between long time interval, such as once every seventy two hours, the ink is not consumed noticeably. However, the idle discharge operation is performed at pretty short interval, thus there is a problem in that much ink is wasted by the idle discharge operation.

Further, the situation is the same for a color printer to record an image on the basis of print data from a host computer. For example, it is not desirable to waste ink by repeating the idle discharge operation of nozzles of C(cyan), M(magenta), and Y(yellow) where only the K(black) is used to print a black and white document.

SUMMARY OF THE INVENTION

The present invention has been made in consideration of the above situation, and has as its object to provide an image recording method and apparatus and a facsimile apparatus employing an image recording apparatus which is capable of preventing the wasting of ink caused by unnecessary recovery operation in an ink-jet recording operation.

Another object is to provide an image recording method and apparatus and a facsimile apparatus having an image recording apparatus which is capable of effectively preventing the wasting of ink caused by the recovery operation by way of switching the performance of the recovery operation in accordance with at least two kinds of recording states, a color recording state using a plurality of colors, and a black and white recording state using only one color.

A further object is to effectively prevent wasting of ink caused by the recovery operation by way of controlling the idle discharge operation which consumes larger amount of ink among the recovery operation in an ink-jet recording operation in accordance with a recording mode.

A further object is to provide an ink-jet printer and a copy machine which consume less amount of ink by applying the aforementioned recording apparatus to the printer and a copy machine.

A further object is to make it possible to prevent wasting of ink caused by the unnecessary recovery operation by performing the recovery operation in accordance with a recording mode of a facsimile which performs ink-jet recording.

A further object is to provide a facsimile apparatus which sets recording mode in dependence upon the result of a negotiation with other facsimile apparatus, and which controls the recovery operation in accordance with the recording mode.

A further object is to provide a facsimile apparatus which has two kinds of modes, a color recording mode and a black and white recording mode, and which sets either one of the recording modes in dependence upon the result of an negotiation with other facsimile apparatus, and which controls the recovery operation in accordance with the recording mode.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE PREFERRED EMBODIMENTS

Preferred embodiments of the present invention will be described in detail in accordance with the accompanying drawings.

First Embodiment

Figure 1:
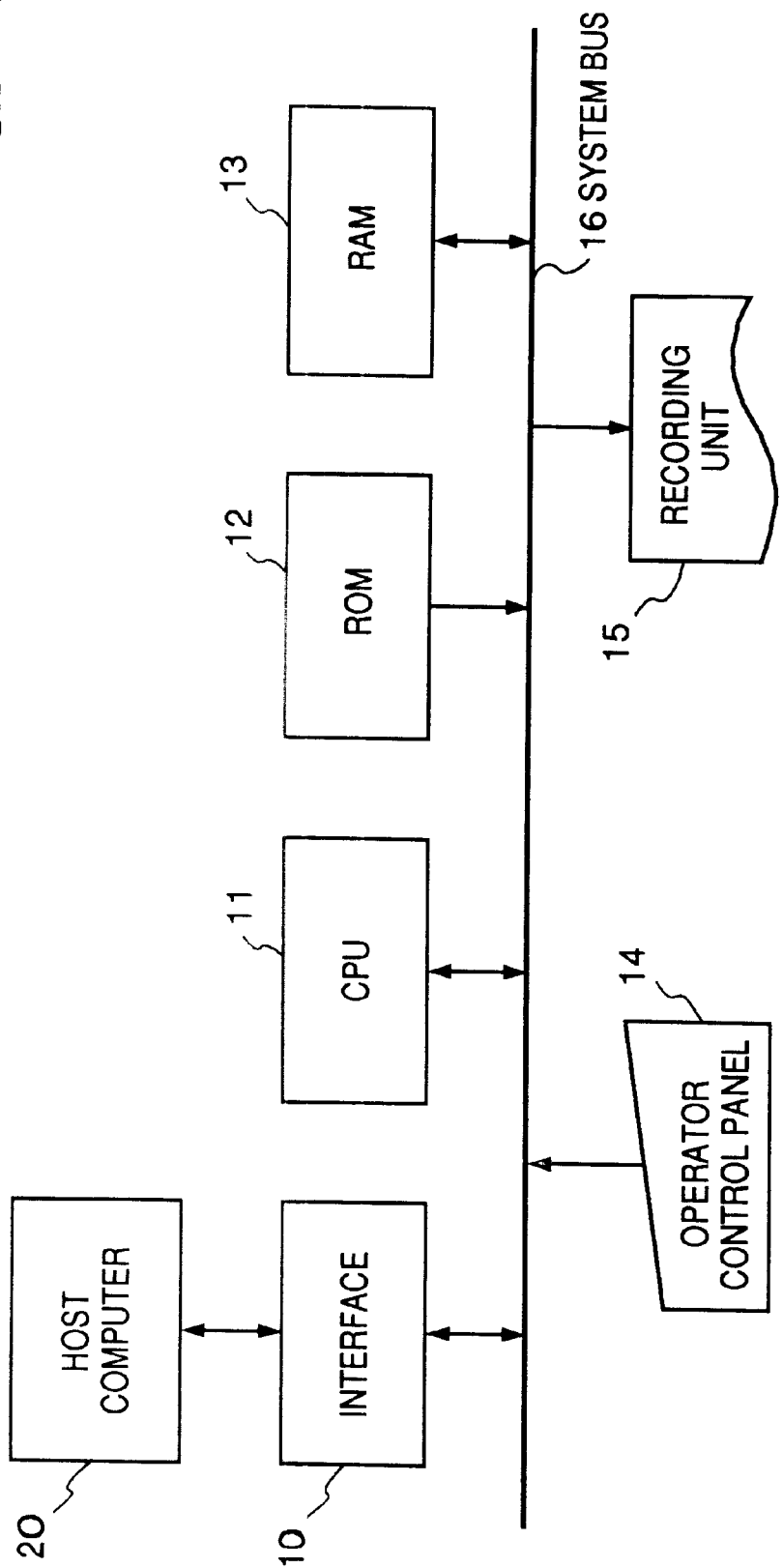
FIG. 1 is a block diagram illustrating a configuration of a color printer in a first embodiment.

FIG. 1 is a block diagram illustrating a configuration of a color printer of the first embodiment.

In FIG. 1, an interface 10 interchanges data, such as printing data, between a host computer 20 and a system bus 16. Reference numeral 11 denotes CPU which controls the entire color printer. Reference numeral 12 denotes ROM, and it stores various kinds of control programs executed by the CPU 11. Reference numeral 13 denotes RAM, and it provides a temporary data storage area and work area for performing different kinds of processes.

Reference numeral 14 denotes an operator control panel, and it inputs various kinds of settings to the color printer. As an operation mode of the printer, either black and white mode or color mode can be selected from the operator control panel 14. 15 indicates a recording unit, and performs ink-jet recording of an image on a recording paper sheet.

Next, the recording unit 15 is described in detail.

Figure 2:
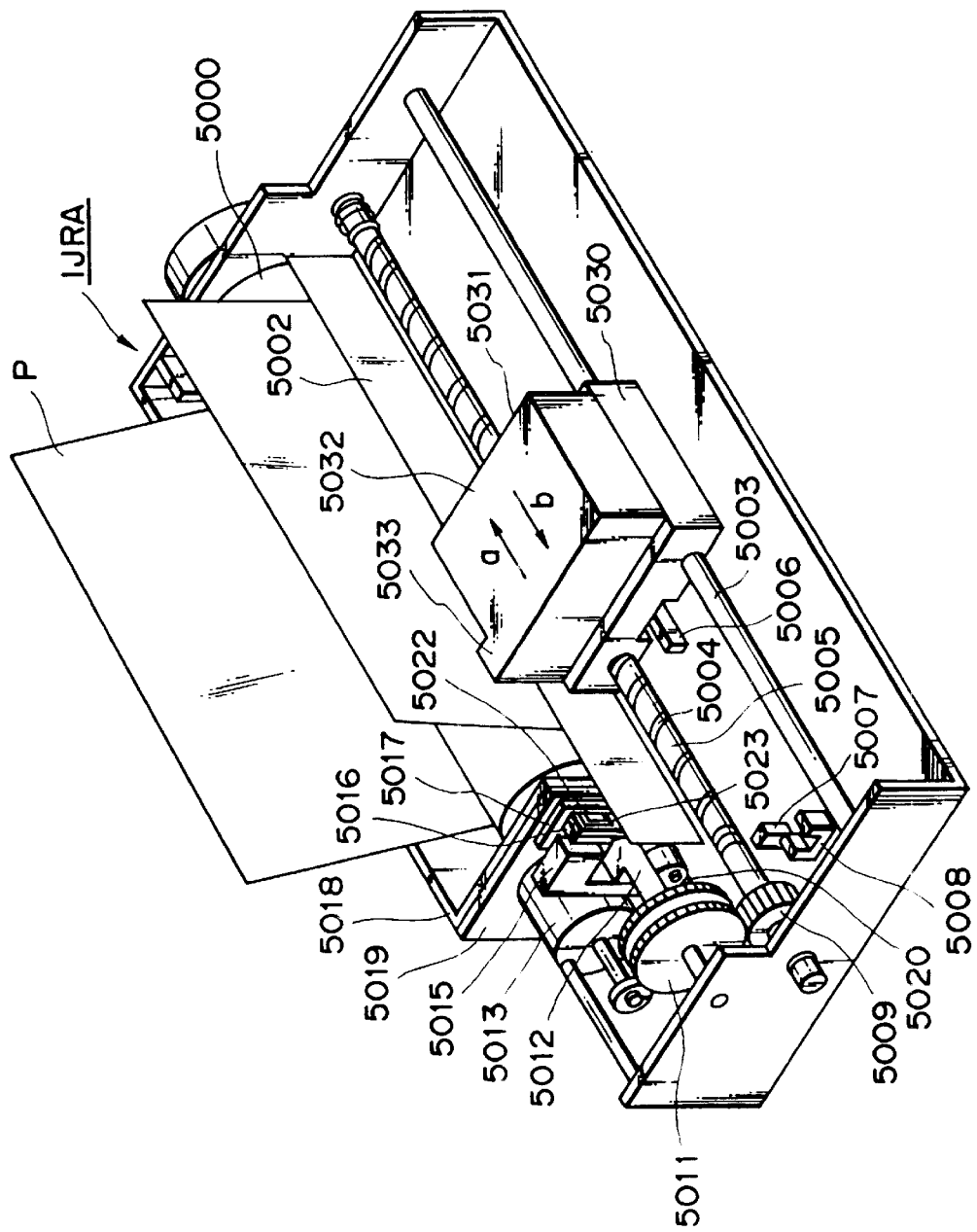
FIG. 2 is a schematic perspective view of an ink-jet recording apparatus (IJRA) used as a recording unit in embodiments.

FIG. 2 is a schematic perspective view of an ink-jet recording apparatus (IJRA) which is used as the recording unit 15. In the figure, a carriage 5030 is engaged with a spiral groove 5004 of a lead screw 5005 which is rotated via driving force transmission gears 5011 and 5009 in synchronism with the forward and reverse rotation of a driving motor 5013. The carriage 5030 has a pin (not shown), and is moved in the directions of arrows a and b. An ink-jet cartridge 5031 is mounted on the carriage 5030.

In the embodiment, the ink-jet cartridge 5031 contains an ink-tank 5032 and a record head 5033 which discharges ink drops from discharge holes by way of causing the ink to change the state by using thermal energy, and it is disposable and can be mount on and dismount from the carriage 5030. Reference numeral 5002 denotes a pressing plate for pressing a paper sheet against a platen 5000 across the moving direction of the carriage. 5007 and 5008 denote photocouplers which constitute a home position detection means for detecting the presence of a lever 5006 of the carriage and, for instance, for switching the rotational direction of the motor 5013.

Reference numeral 5016 denotes a member for supporting a cap member 5022 for capping the front surface of the record head. 5015 is a suction means for drawing idle discharged ink to be discarded from the ink-jet cartridge 5031 by suction, and draw the idle discharged ink via an intra-cap opening 5023. Reference numeral 5017 denotes a cleaning blade; and 5019, a member for supporting the blade 5017 to be movable in the back-and-forth direction. These members are supported on a main body support plate 5018. The shape of the blade 5017 is not limited to the one illustrated in FIG. 8 and a known cleaning blade can be applied to this embodiment. Reference numeral 5012 denotes a lever for initiating a suction process of the suction recovery. The lever 5012 is moved upon movement of a cam 5020 which is engaged with the carriage, and its movement control is performed by known transmission means, such as clutch switching, on the basis of the driving force from the driving motor.

These capping, cleaning, and suction processes are designed to be executed at their corresponding positions upon operation of the lead screw 5005 when the carriage reaches an area at the home position side. However, the present invention is not limited to this as long as required operations are performed at known timings.

Figure 3:
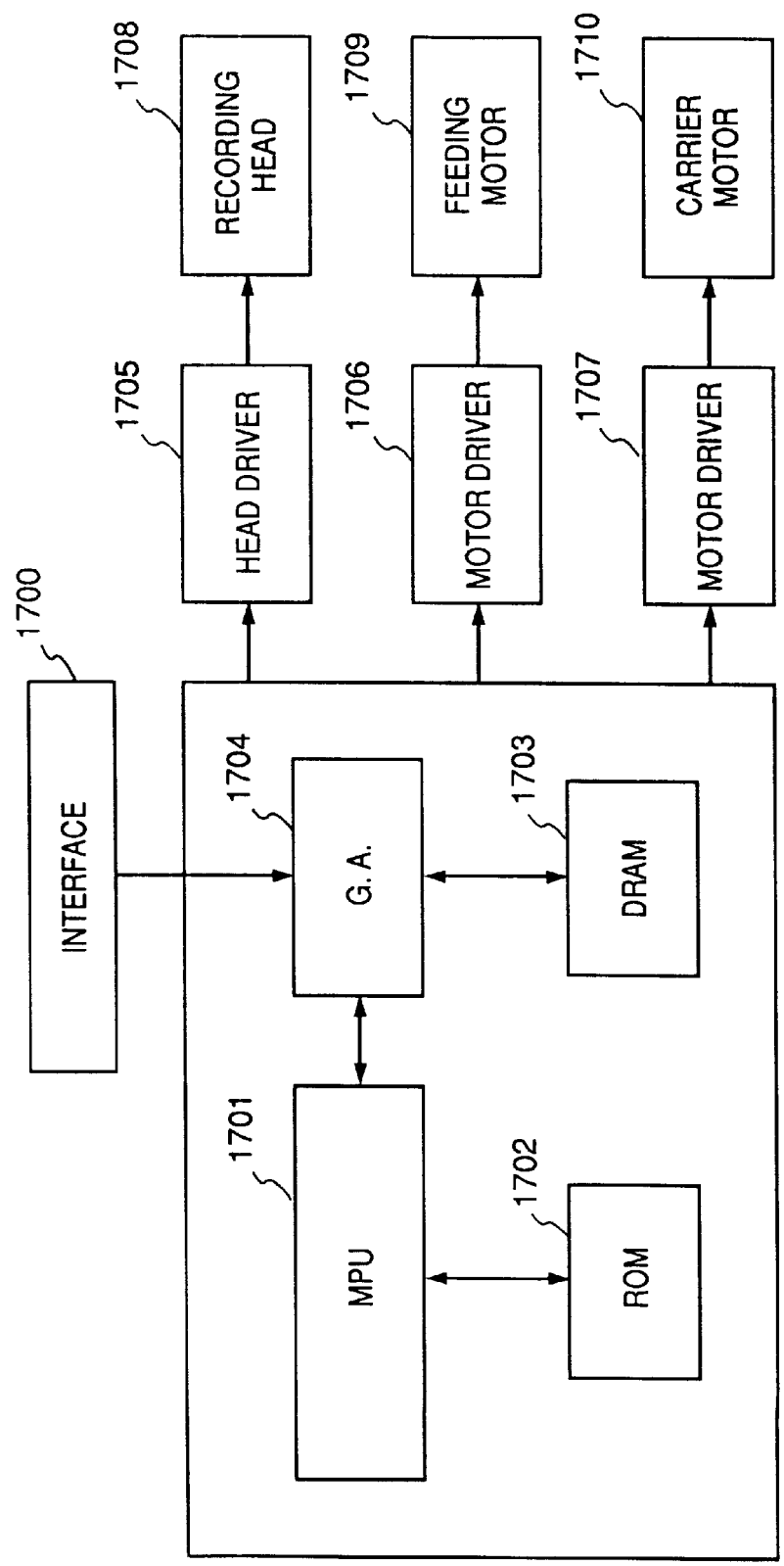
FIG. 3 is a block diagram illustrating a controlling configuration for performing record control in FIG. 2.

The control arrangement for executing record control of the above-mentioned apparatus will be described below with reference to the block diagram shown in FIG. 3. Referring to FIG. 3 showing the control circuit, reference numeral 1700 denotes an interface for inputting a recording signal; 1701, a micro-processor (MPU); 1702, a program ROM for storing a control program to be executed by the MPU 1701; and 1703, a dynamic RAM for storing various data (the recording signal, record data to be supplied to a record head, and the like). Reference numeral 1704 denotes a gate array for controlling supply of record data to the record head 1708, and also performing data transfer control among the interface 1700, the MPU 1701, and the RAM 1703.

Reference numeral 1710 denotes a carrier motor for conveying the record 1708; and 1709, a feeding motor for feeding a recording paper sheet. Reference numeral 1705 denotes a head driver for driving the record head 1708; and 1706 and 1707, motor drivers for respectively driving the feeding motor 1709 and the carrier motor 1710.

The operation of the control arrangement will be described below. When a recording signal is inputted to the interface 1700, the recording signal is converted into record data for a print operation between the gate array 1704 and the MPU 1701. The motor drivers 1706 and 1707 are driven, and the record head 1708 is driven in accordance with record data supplied to the head driver 1705, thereby performing a recording operation.

Next, the recording operation of the recording unit 15 will be schematically described below.

Figure 4:
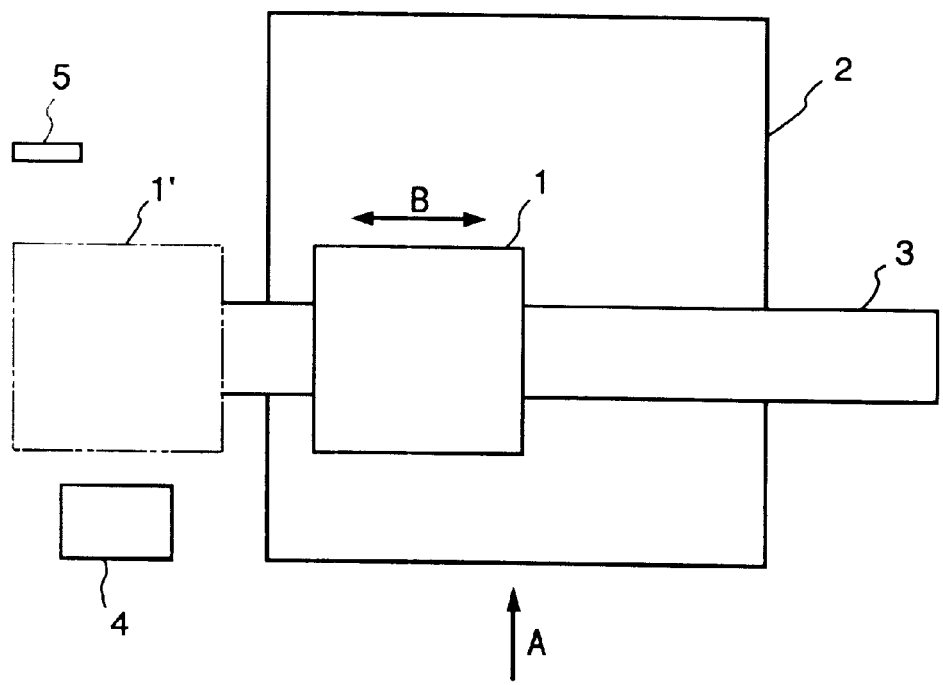
FIG. 4 illustrates positions where a recording is performed on a recording paper sheet, and where idle discharge operation is performed.
Figure 5:
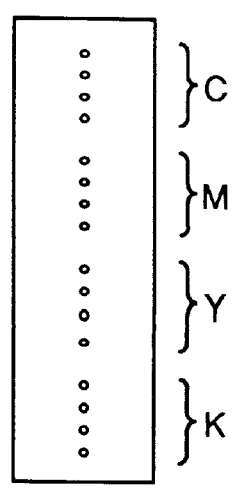
FIG. 5 illustrates a configuration of record heads which contain nozzles to discharge respective color ink for color recording.

FIG. 4 shows an arrangement of positions for printing on a printing paper sheet and for the idle discharge operation. Further, FIG. 5 shows an arrangement of the record head having nozzles for discharging respective color ink for a color recording. The recording operation of the recording unit 15 will be described with reference to FIGS. 4 and 5.

FIG. 4 shows the schematic view of a mechanical unit of the recording unit 15. A nozzle unit 1 (constituted with the ink-jet cartridge 5031 and the carriage 5030) has an ink-tank 5032 which stores various color ink (i.e., C:cyan, M:magenta, Y:yellow, K:black), and discharges the ink onto a recording paper sheet 2 from the nozzles. A guide 3 (constituted with the lead screw 5005 and a driving guide 5003) is a support for the nozzle unit 1 to move in the right-and-left directions.

Further, a sensor 4 detects that the nozzle unit has moved to the position of the idle discharge operation. The recording paper sheet 2 which an image is printed on is moved in the direction of an arrow A by the motor driving force (not shown). The nozzle unit 1 discharges ink onto the recording paper sheet 2 while moving along the guide 3 in the direction of an arrow B, i.e., in the right-and-left directions. Thus, by moving the recording paper sheet in the direction of the arrow A while the nozzle unit 1 is moved in the direction of the arrow B, a page recording can be operated.

Further, as is shown in FIG. 5, a plurality of nozzles for discharging ink are divided in accordance with colors, and are arranged on the record head 5033. For a color recording, colors are expressed by using each color of C, M, Y, and K. For a black and white recording, in contrast, the recording is operated by using only K (black) ink. In FIG. 5, a number of nozzles for each color ink is four, however, 24 to 64 nozzles are arranged for each color ink in general.

In an actual recording operation, the idle discharge operation is performed at a predetermined interval in order to stabilize the discharging amount of ink. In the idle discharge operation, an ink-tray 5 (FIG. 4) for disposed ink is arranged outside of the area where a recording paper sheet is set, and ink is discharged onto the ink-tray 5. The position of a nozzle unit 2 is at 1' in FIG. 4, and the position is detected by a sensor 4. In other words, when the idle discharge operation is operated, the nozzle unit 1 is stopped at the position 1' where the sensor 4 detects for the idle discharge operation (the nozzle unit 1 is moved outside of the printing area of the printing paper sheet 2 at this state), then the ink is discharged onto the ink-tray 5 at the position.

Figure 6:
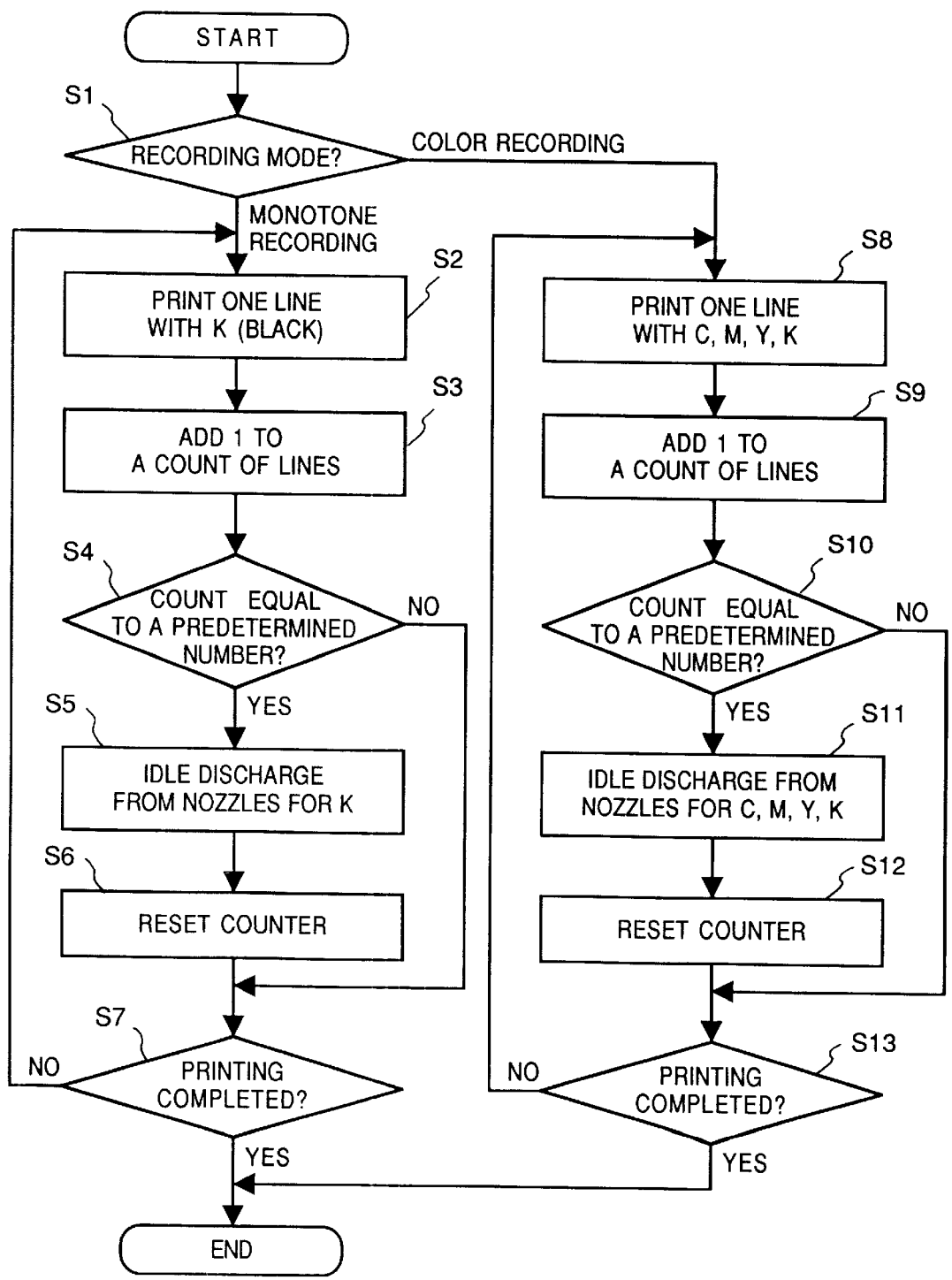
FIG. 6 is a flowchart showing record processing sequence in the first embodiment.

Next, the recording process of the embodiment will be described with reference to the flowchart in FIG. 6. FIG. 6 is the flowchart showing the record processing sequence of the first embodiment. A control program for performing the control shown in the flowchart is stored in ROM 12, and executed by CPU 11.

At step SI, a recording mode, whether a black and white recording or a color recording, is detected before initiating the recording. The recording mode can be manually set from a control panel 14. In a case where the recording is operated in black and white, only the nozzles for K(black) in FIG. 5 is used since only the K ink is necessary to record. Whereas, in a case where the recording mode indicates a color recording, all the color nozzles for C, M, Y, and K are necessary for the recording.

At step S1, if the printing mode shows the black and white recording, the process goes to step S2. The black and white recording is operated at steps S2 to S7. First, one line is recorded by using the nozzles of K at step S2. At step S3, a count for lines is added by 1 at each time when the recording by a line is completed. Then at step S4, whether or not the count of lines is reached to a predetermined number is determined. The number of lines can be also obtained by counting a number of returns of the carriage detected by the photocouplers 5007, 5008, or the sensor 4, and counted by the CPU 11. The same determination at step 4 that whether or not the count has reached the predetermined number can be performed by counting a number of times of transferring the recording data which is stored in the RAM 13 to the recording unit 15.

If the completion of recording of the same number of lines as the predetermined number is determined at step S4, process moves to step S5. At step S5, the nozzle unit 1 is stopped at the position of 1', and the idle discharge operation is performed. Then at step S6, the number of counted lines is reset. After this at step S7, the completion of all the recording operation is checked, and if the recording operation is not completed, the process goes back to step S2. Further, in a case where the number of lines has not reached the predetermined number at step S4, the process moves to step S7 without performing the idle discharge operation.

As described above, the idle discharge operation is repeated whenever the number of lines reaches the predetermined number, until the entire recording is completed. Note that the recording and the idle discharge operation performed at steps S2 to S7 are operated by using only the K (black) nozzles. Regarding the nozzles of C (cyan), M (magenta), and Y (yellow), the idle discharge operation is not performed on them. In contrast, in a case where the recording mode is color printing at step S1, the process move to step S8. At steps S8 to S13, the color printing is performed and all the nozzles of C, M, Y, and K are used.

At step S8, one line is recorded by using the nozzles of C, M, Y, and K on the basis of data transferred from the RAM 13. At step S9, a count of lines is added by 1. Then at step S10, whether or not the counted number of lines has reached the predetermined number is determined.

If the completion of the recording of the same number of lines as the predetermined number is determined at step S10, then the process moves to step S11. At step S11, the nozzle unit 1 is stopped at the position of 1', and the idle discharge operation on all the nozzles for C, M, Y, and K is performed. Then at step S12, the count of lines is reset. After this at step S13, the completion of the recording is checked, and if the recording is not completed, the process goes back to step S8, and aforementioned processes are repeated. If all the recording is completed, then entire process is finished. Further, in a case where the count of recorded lines has not reached the predetermined number at step S10, the process moves to step S13 without performing the idle discharge operation.

As is explained above, in a color recording process, the recording operation of the count of lines and the idle discharge operation are performed every other times, and are continued until the entire recording operation is completed.

By performing the processes described above, a proper recording operation is performed as well as the idle discharge operation is controlled so that it is performed only on the K nozzles for the black and white recording mode, and on all the nozzles of C, M, Y, and K for the color printing mode.

Figure 7:
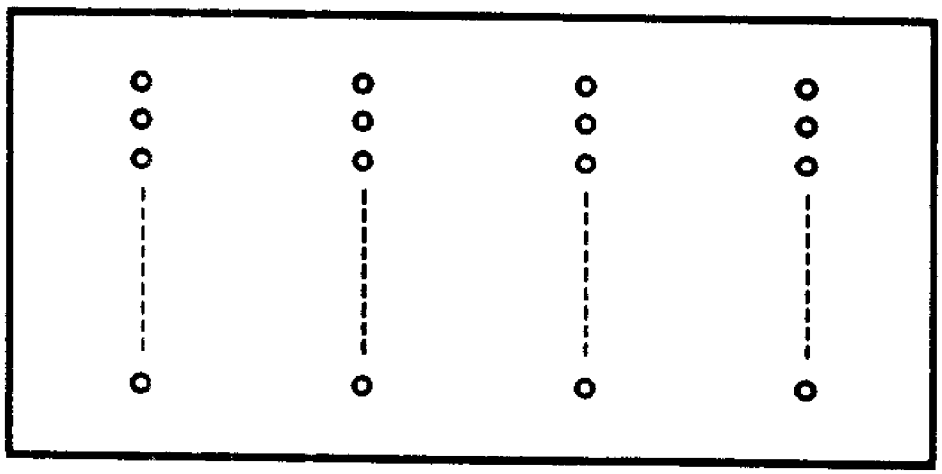
FIG. 7 illustrates a configuration of another arrangement of nozzles which discharges respective color ink for a color recording.

It should be noted that in FIG. 4 the position where the idle discharge operation is performed is on the left side with respect to the moving direction of the recording paper sheet 2, however, any position can be allowed as far as the position does not include an area of the recording paper sheet 2. Thus the position of the idle discharge operation can be the right side, instead of left side. Further, the arrangement of the respective ink nozzles is not limited to the arrangement shown in FIG. 5. As shown in FIG. 7, the nozzles of C, M, Y, and K can be arranged horizontally. Furthermore, the order of colors, C, M, Y, and K can be freely exchanged.

Figure 8:
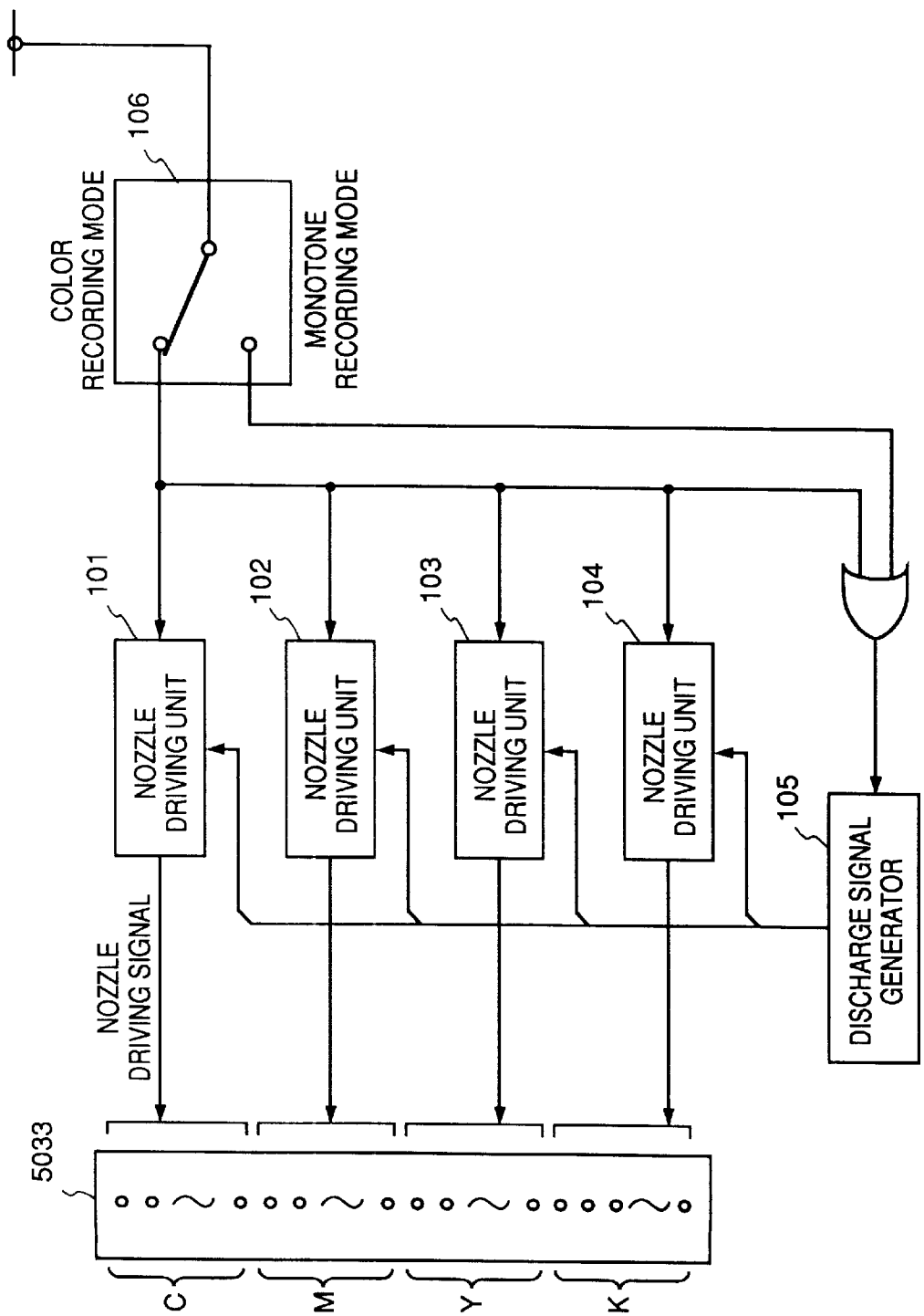
FIG. 8 illustrates an example of controlling configuration of record heads in the embodiments.

FIG. 8 shows an example of a control configuration of the record head driving unit in the embodiment. In FIG. 8, reference numeral 101 denotes a nozzle driving unit for C (cyan). Likewise, reference numeral 102 denotes a nozzle driving unit for M (magenta), 103 for Y (yellow), and 104 for K (black). A discharge signal generator 105 controls discharge of respective nozzles for each color on the basis of the image data. Note that the idle discharge operation is also controlled in accordance with the instruction form the discharge signal generator 105.

Reference numeral 106 denotes a switch for setting the recording modes, and mounted on the operator control panel 14, for example. If the switch 106 is set to a color recording mode, then an enable signal which permits the nozzle driving units 101 to 104 to perform is generated. Accordingly, operations, such as an image recording operation and the idle discharge operation, become effective to all the nozzles. Whereas, when the switch 106 is set to a black and white recording mode, only the nozzle driving unit 104 for K becomes a state of enable, thus operations, such as an image recording and the idle discharge operation, are operated only by/on the nozzles of K.

It should be noted that a control configuration is not limited to the one shown in FIG. 8. For example, regarding the permission/prohibition for driving the nozzles, it can be controlled by using software instead of using the enable signal.

As is explained above, according to the embodiment, the idle discharge operation is performed only on the nozzles which are indicated in accordance with the recording mode. Thus in a case where the black and white recording mode is selected, the idle discharge operation of the nozzles for C, M, and Y is prohibited, thereby unnecessary idle discharges operations are prevented and consumption of ink can be reduced.

Note that if the device which is connected to the interface 10 is a scanner in the first embodiment, a color copy machine can be formed when a recording is performed on the basis of the original image scanned by the scanner. Therefore, it is obvious that the apparatus described in the first embodiment can be applied to the copy machine.

Further, the recording mode of either the black and white recording or the color recording is set from the operator control panel 14 in the first embodiment, however, it can be set from the host computer 20.

Further, regarding the interval between the idle discharge operations, it is possible for the number of recorded lines which makes the idle discharge operation initiated to be altered in dependence on the conditions such as the discharge frequency of ink and the surrounding temperature.

Second Embodiment

A second embodiment will be described below. In the second embodiment, a recording apparatus which operates the idle discharge operation and which explained in the first embodiment is applied to a color facsimile apparatus.

Figure 9:
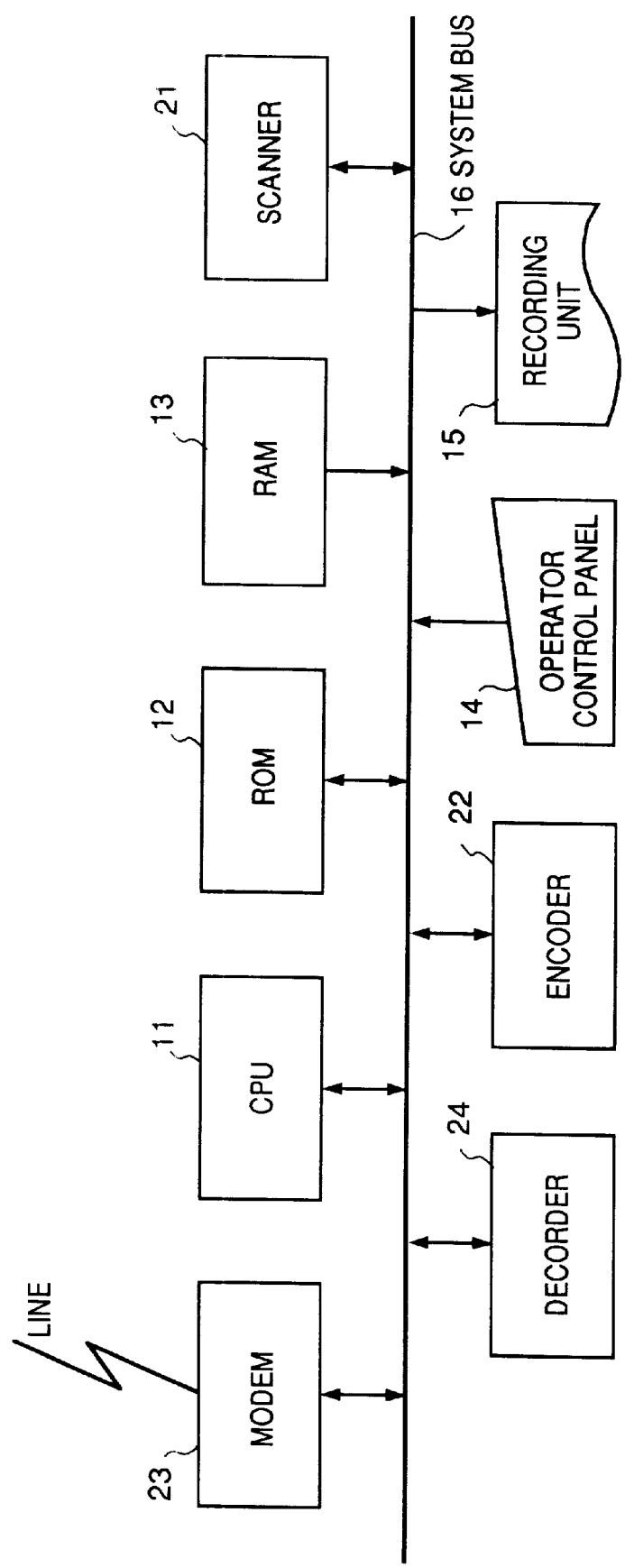
FIG. 9 is a block diagram illustrating a structure of a color facsimile in a second embodiment.

FIG. 9 is a block diagram showing a configuration of the color facsimile in the second embodiment. In the figure, reference numerals which have appeared above denotes the same units that have explained in the first embodiment, therefore, the descriptions of those numerals are omitted.

In FIG. 9, reference numeral 21 denotes a scanner, and it scans an original image to be transmitted and generates image signals. An encoder 22 encodes the image signals generated by the scanner 21. Reference numeral 23 denotes a modem, and it connects a telephone line and the color facsimile apparatus. The decoder 24 decodes the data received via the modem 23.

According to the above constitution, the procedure to transmit an image by the facsimile is: set an original image in the scanner; input a dial number of a facsimile of the receiving side by the operator control panel 14; designate the start of transmission. The image signals generated by the scanner 21 based on the original image are encoded by the encoder 22, then the encoded data is transmitted to the telephone line via the modem 23 and sent to the designated facsimile apparatus of the receiving side. Whereas, in a case where data from other facsimile apparatus is received by the facsimile apparatus of the second embodiment, the received data is decoded by the decoder 24, then image data is generated. The image data is held in the RAM 13, and sequentially recorded at the recording unit 15.

Figure 10:
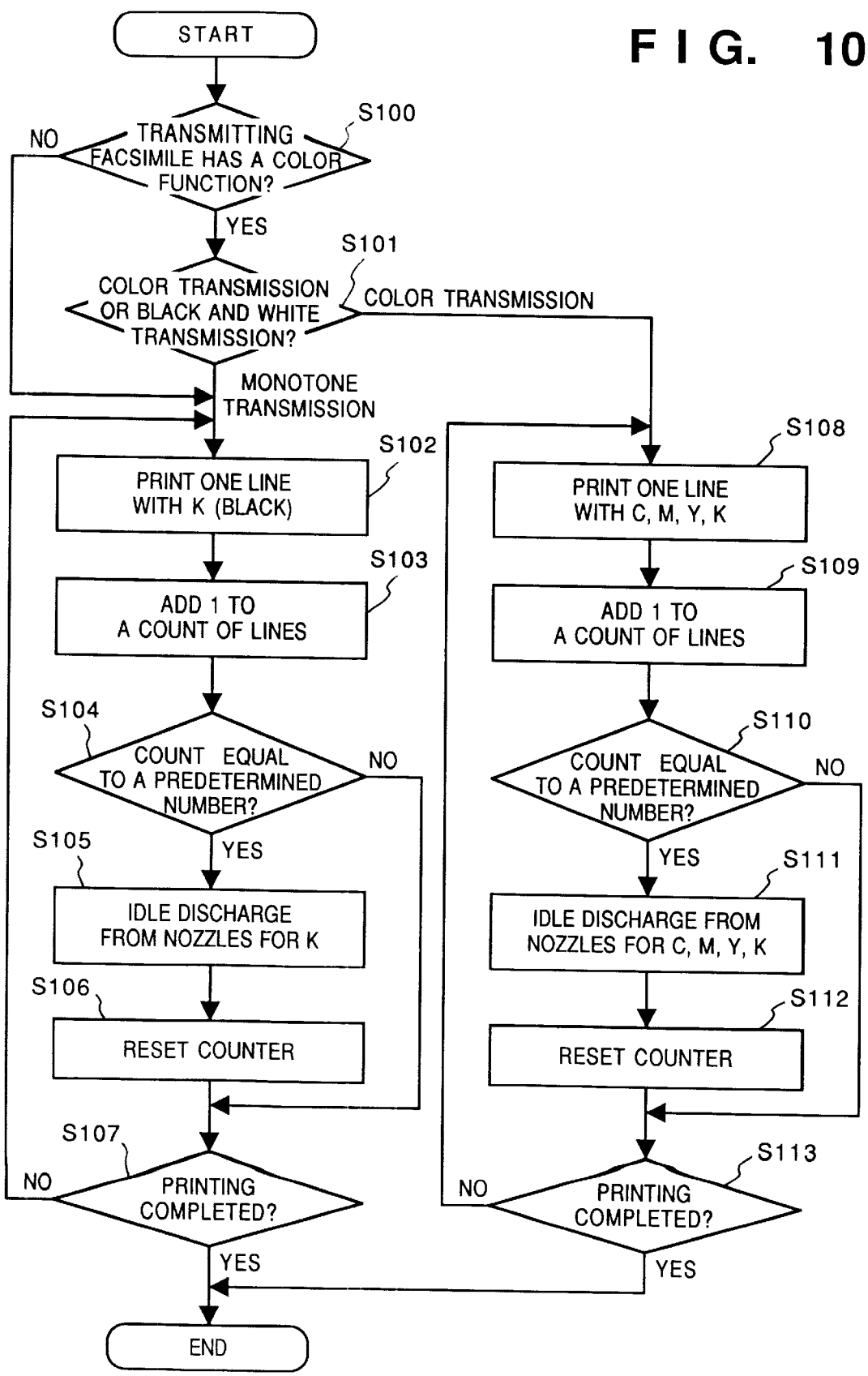
FIG. 10 is a flowchart showing record processing sequence of the color facsimile in the second embodiment during reception of data.

Next, an operation of the color facsimile of the second embodiment is explained with reference to a flowchart in FIG. 10. FIG. 10 is the flowchart showing the record processing sequence when data is received by the color facsimile apparatus of the second embodiment. It should be noted that a program to control the operation shown in the flowchart is stored in the ROM 12, and executed by CPU 11.

The receiving process starts when data is received via the modem 23. First, negotiation to confirm the size of an original image is performed with the sending-side facsimile apparatus. At step S100, whether or not the sending-side facsimile apparatus has a color function is detected during the negotiation. A color function means a function enable to read the original image in color, and to send the image in color. If the sending-side facsimile apparatus does not have a color function, then the process goes to step S102 to perform a black and white print operation.

If the sending-side facsimile apparatus has a color function, then the process moves to step S101. At step S101, whether the sending-side facsimile apparatus performs a color transmission or the black and white transmission is detected during the negotiation. When a color transmission is detected here, the process goes to step S108 to perform a color print operation. Whereas, when a black and white transmission is detected, then the process moves to step S102 to perform a black and white print operation.

The black and white print operation shown at steps S102 to S107, and the color print operation shown at steps S108 to S113 are the same as the ones described at steps S2 to S7, and steps S8 to S13, respectively, in the first embodiment. Thus the detailed explanation is omitted.

As described above, printing of one page is completed. In a case where there is data for a second or more pages, the operation described at step S100 to S113 is repeated. In other words, for the second and later pages, as same as the first page, whether or not color printing is operated is determined during the negotiation with the sending-side facsimile apparatus (steps S100 and S101), and either the black and white printing or color printing is performed in dependence on a result of the determination.

As is explained above, according to the second embodiment, in a facsimile apparatus having an ink-jet printer capable of color printing as a printing unit of the facsimile, the idle discharge operation which is one of the recovery operations to keep the quality of the ink-jet printer is properly controlled. Namely, during a color recording, the idle discharge operation is performed on all nozzles of ink (C, M, Y, and K) used for the color printing, and during a black and white recording, the idle discharge operation is performed only on the nozzles for K (black). Thus, unnecessary idle discharge operation is prevented, and thereby consumption of ink can be reduced.

Further, as in the first embodiment, the number of times for the idle discharge operation per page can be adjusted in accordance with the conditions, such as discharge frequency of ink and surrounding temperature. Furthermore, in a case where the configuration is constructed with a hardware shown in FIG. 8, the switch 106 is changed based on a result of negotiation.

The present invention is especially advantageous to be applied to an ink-jet record head and recording apparatus, that perform recording by utilizing thermal energy to form flying fluid droplets, among various ink-jet recording system, so as to obtain excellent recording.

As for the typical structure and principle, it is preferable that the basic structure disclosed in, for example, U.S. Pat. Nos. 4,723,129 or 4,740,796 be employed. The aforesaid method can be adapted to both a so-called on-demand type apparatus and a continuous type apparatus. In particular, a satisfactory advantage can be obtained when the on-demand type apparatus is employed because of the structure is arranged in such a manner that one or more drive signals, which rapidly raise the temperature of an electricity-to-heat converter disposed to face a sheet or a fluid passage which holds the fluid (ink) to a level higher than levels at which nuclear boiling takes place are applied to the electricity-to-heat converter so as to generate heat energy in the electricity-to-heat converter and to cause the heat effecting surface of the record head such that film boiling occurs so that bubbles can be formed in the fluid (ink) to correspond to the one or more drive signals. The enlargement/contraction of the bubble will cause the fluid (ink) to be discharged through a discharging opening so that one or more droplets are formed. If a pulse shape drive signal is employed, the bubble can be enlarged/contracted immediately and properly, causing a further preferred advantage to be obtained because the fluid (ink) can be discharged while revealing excellent responsiveness. It is preferable that a pulse drive signal disclosed in U.S. Pat. Nos. 4,463,359 or 4,345,262 be employed. If conditions disclosed in U.S. Pat. No. 4,313,124 which describes an invention relating to the temperature rising ratio at the heat effecting surface are employed, a satisfactory print result can be obtained.

As an alternative to the structure (linear fluid passage or perpendicular fluid passage) of the record head disclosed in each of the aforesaid inventions and having an arrangement that discharge ports, fluid passages and electricity-to-heat converters are combined, a structure having an arrangement that the heat effecting surface is disposed in a bent region and disclosed in U.S. Pat. Nos. 4,558,333 or 4,459,600 may be employed.

In addition, the following structures may be employed: a structure having an arrangement that the common slit is formed to serve as a discharge section of a plurality of electricity-to-heat converters and disclosed in Japanese Patent Laid-Open No. 59-123670; and a structure disclosed in Japanese Patent Laid-Open No. 59-138461 in which an opening for absorbing pressure waves of heat energy is disposed to correspond to the discharge section.

Furthermore, as a record head of the full line type having a length corresponding to the maximum width of a record medium which can be recorded by the recording apparatus, either the construction which satisfies its width by a combination of a plurality of record heads as disclosed in the above specifications or the construction as a single full line type record head which has integrally been formed can be used.

In addition, the invention is effective for a record head of the freely exchangeable chip type which enables electrical connection to the recording apparatus main body or supply of ink from the main device by being mounted onto the apparatus main body, or for the case by use of a record head of the cartridge type provided integrally on the record head itself.

It is preferred to additionally employ the record head restoring means and the auxiliary means provided as the component of the present invention because the advantage of the present invention can be further stabled. Specifically, it is preferable to employ a record head capping means, a cleaning means, a pressurizing or suction means, an electricity-to-heat converter, an another heating element or a sub-heating means constituted by combining them and a sub-emitting mode in which an emitting is performed independently from the printing emitting in order to stably perform the printing operation.

Although a fluid ink is employed in the aforesaid embodiment of the present invention, ink which solidifies at room temperature, ink in the form of a fluid at room temperature, or an ink which is formed into a fluid when the print signal is supplied may be employed because the aforementioned ink-jet method is ordinarily arranged in such a manner that the temperature of ink is controlled in a range from 30° C. or higher to 70° C. or lower so as to make the viscosity of the ink to be included in a stable discharge range.

Furthermore, ink of the following types can be adapted to the present invention: ink which liquefies when heat energy is supplied in response to the print signal so as to be discharged in the form of fluid ink, the aforementioned ink being exemplified by ink, the temperature rise of which due to supply of the heat energy is positively prevented by utilizing the temperature rise as energy of state change from the solid state to the liquid state; and ink which solidifies when it is allowed to stand for the purpose of preventing the ink evaporation. Furthermore, ink which first liquefies when supplied with heat energy may be adapted to the present invention. In the aforementioned case, the ink may be of a type which is held as fluid or solid material in a recess of a porous sheet or a through hole at a position to face the electricity-to-heat converter as disclosed in Japanese Patent Laid-Open No. 54-56847 or Japanese Patent Laid-Open No. 60-71260. It is the most preferred way for ink to be adopted to the aforementioned film boiling method.

In addition, the recording apparatus can be utilized as an image output terminal of an information processing apparatus, such as word processors and computers, mounted integrally or separately, further utilized as a copy apparatus which is combined with a leader or the like, or as a facsimile apparatus having transmitting/receiving functions.

Further, the ink-jet method in the present invention is not limited to employing thermal energy, but can be one employing the piezo-elements or the like.

As is described above, in a facsimile apparatus having a recording unit capable of a color recording, the idle discharge operation which is one of the recovery operations to keep the quality of an ink-jet printer is performed on nozzles used for color printing, namely C(cyan), M(magenta), Y(yellow), and K(black) in a case where color printing is performed, whereas the idle discharge operation is performed only on nozzles for K(black) in a case where a black and white printing is performed. Thereby consumption of ink used for color printing can be reduced.

Therefore, according to this invention, consumption of ink is reduced by preventing unnecessary recovery operation during printing performed by an ink-jet printer.

Furthermore, the present invention can be applied to the system comprising either a plurality of units or a single unit. It is needless to say that the present invention can be applied to the case which can be attained by supplying programs which execute the process defined by the present system or invention.

As many apparently widely different embodiments of the present invention can be made without departing from the spirit and scope thereof, it is to be understood that the invention is not limited to the specific embodiments thereof except as defined in the claims.

What is claimed is:

1. An image recording apparatus which records an image on a recording medium based on image data transmitted from an external apparatus, comprising:

a record head having a plurality of nozzles which correspond to a plurality of colors, and performing a recording by discharging ink from the nozzles based on image data;

first determination means for communicating with the external apparatus and determining whether the external apparatus has a capability of transmitting image data representing an image having a plurality of colors;

first setting means for setting a recording mode to a first recording mode in which recording is performed by using nozzles corresponding to a specific color, when said first determination means determines that the external apparatus does not have said capability;

second determination means for communicating with the external apparatus and determining whether image data to be transmitted from the external apparatus represent an image of the specific color or an image of a plurality of colors when said first determination means determines that the external apparatus has said capability;

second setting means for setting the recording mode to the first recording mode when said second determination means determines that the image data represent an image of the specific color, and setting the recording mode to a second recording mode in which recording is performed by using nozzles corresponding to the plurality of colors when said second determination means determines that the image data represent an image of the plurality of colors;

recording control means for controlling said record head to record an image in either said first recording mode or said second recording mode; and idle discharge means for performing an idle discharge operation of said record head at a predetermined timing during the recording operation performed by said recording control means, based on the recording mode set by said first setting means or said second setting means, wherein said idle discharge means performs the idle discharge operation on only the nozzles corresponding to the specific color when said first recording mode is set, while said idle discharge means performs the idle discharge operation on the nozzles corresponding to the plurality of colors when said second recording mode is set.

2. The image recording apparatus according to claim 1, wherein said second recording mode indicates the use of all of the plurality of colors, and said first recording mode indicates the use of only one color out of the plurality of colors.

3. The image recording apparatus according to claim 1, wherein colors of cyan, magenta, yellow, and black are contained in the plurality of colors, and wherein said second recording mode indicates the use of all of a plurality of colors, and said first recording mode indicates the use of only black color out of the plurality of colors.

4. The image recording apparatus according to claim 1, wherein said idle discharge means counts a number of recorded lines, and performs the idle discharge operation on the nozzles for the used colors corresponding to the recording mode set by said first setting means or said second setting means whenever the count of lines reaches a predetermined number.

5. The image recording apparatus according to claim 1, wherein said recording control means controls said record head to record, in either said first recording mode or said second recording mode, on the basis of the image signals obtained by scanning an original image optically.

6. The image recording apparatus according to claim 1, wherein said record head discharges ink by use of thermal energy and comprises an electricity-to-heat converter.

7. The image recording apparatus according to claim 6, wherein said record head causes the ink to change state by using thermal energy supplied by said electricity-to-heat converter, and discharges ink from the nozzles depending on the state of ink.

8. An image recording method for controlling an image recording apparatus to record an image on a recording medium based on image data transmitted from an external apparatus using a record head having a plurality of nozzles which correspond to a plurality of colors, and performing a recording by discharging ink from the nozzles based on the image data, said method comprising:

a first determination step of communicating with the external apparatus and determining whether the external apparatus has a capability of transmitting image data representing an image of a plurality of colors;

a first setting step of setting a recording mode of the recording apparatus to a first recording mode in which recording is performed by using nozzles corresponding to a specific color, when it is determined in said first determination step that the external apparatus does not have said capability;

a second determination step of communicating with the external apparatus and determining whether image data to be transmitted from the external apparatus represent an image of the specific color or an image of a plurality of colors when it is determined in said first determination step that the external device has said capability;

a second setting step of setting the recording mode of the image recording apparatus to said first recording mode when it is determined in said second determination step that the image data represent an image of the specific color, and setting the recording mode to a second recording mode in which recording is performed by using nozzles corresponding to the plurality of colors when it is determined in said second setting step that the image data represent an image of a plurality of colors;

a recording control step of controlling said record head to record an image in either said first recording mode or said second recording mode; and an idle discharge step of performing an idle discharge operation of the record head at a predetermined timing during the recording operation performed by said recording control means, based on the recording mode set in said first setting step or said second setting step, wherein the idle discharge operation is performed on only the nozzles corresponding to the specific color in said idle discharge step when said first recording mode is set, while the idle discharge operation is performed on the nozzles corresponding to the plurality of colors in said idle discharge step when said second recording mode is set.

9. The image recording method according to claim 8, wherein said second recording mode indicates the use of all of the plurality of colors, and said first recording mode indicates the use of only one color out of the plurality of colors.

10. The image recording method according to claim 8, wherein colors of cyan, magenta, yellow, and black are contained in the plurality of colors, and wherein said second recording mode indicates the use of all of a plurality of colors, and said first recording mode indicates the use of only black color out of the plurality of colors.

11. The image recording method according to claim 8, wherein, at said idle discharge step, a number of recorded lines is counted, and the idle discharge operation on the nozzles for the used colors corresponding to the recording mode set by said first setting step or said second setting step is performed whenever the line count reaches a predetermined number.

12. The image recording method according to claim 8, wherein, at said recording control step, the image is recorded, in either said first recording mode or said second recording mode, on the basis of the image signals obtained by scanning an original image optically.

13. The image recording method according to claim 8, wherein said record head discharges ink by use of thermal energy and comprises an electricity-to-heat converter.

14. The image recording method according to claim 13, wherein said record head causes the ink to change state by using thermal energy which is produced by said electricity-to-heat converter, and discharges ink from the nozzles depending on the state of ink.

15. A facsimile apparatus which records an image on a recording medium based on image data transmitted from an external facsimile apparatus, comprising:
- a record head having a plurality of nozzles which correspond to a plurality of colors, and performing a recording by discharging ink from the nozzles based on the image data;
- first determination means for communicating with the external facsimile apparatus and determining whether the external facsimile apparatus has a capability of transmitting image data representing an image of a plurality of colors;
- first setting means for setting a recording mode to a first recording mode in which recording is performed by using nozzles corresponding to a specific color, when said first determination means determines that the external facsimile apparatus does not have said capability;
- second determination means for communicating with the external facsimile apparatus and determining whether image data to be transmitted from the external facsimile apparatus represent an image of the specific color or an image of a plurality of colors when said first determination means determines that the external facsimile apparatus has said capability;
- second setting means for setting the recording mode to said first recording mode when said second determination means determines that the image data represent an image of the specific color, and setting the recording mode to a second recording mode in which recording is performed by using nozzles corresponding to the plurality of colors when said second determination means determines that the image data represent an image of a plurality of colors;
- recording control means for controlling said record head to record an image in either said first recording mode or said second recording mode; and
- idle discharge means for performing an idle discharge operation of said record head at a predetermined timing during the recording operation performed by said recording control means, based on the recording mode set by said first setting means or said second setting means,
- wherein said idle discharge means performs the idle discharge operation on the nozzles corresponding to the specific color when said first recording mode is set, while said idle discharge means performs the idle discharge operation on the nozzles corresponding to the plurality of colors when said second recording mode is set.

16. The facsimile apparatus according to claim 15, wherein said first setting means and said second setting means select either the first recording mode or the second recording mode to be employed on the basis of the result of a negotiation which is performed with the external facsimile apparatus before receiving image data.

17. The facsimile apparatus according to claim 16, wherein said second recording mode is a color printing mode and said first recording mode is a monochrome printing mode, and wherein said second determination means determines whether the image data to be received from the external facsimile apparatus is color data or monochrome data.

18. The facsimile apparatus according to claim 15, wherein said record head discharges ink by use of thermal energy and comprises an electricity-to-heat converter.

19. The facsimile apparatus according to claim 18, wherein said record head causes the ink to change state by using thermal energy which is produced by said electricity-to-heat converter, and discharges ink from the nozzles depending on the state of ink.

20. An image recording apparatus which records an image on a recording medium based on image data transmitted from an external apparatus comprising:
- a record head having a plurality of nozzles which correspond to a plurality of colors, and performing a recording by discharging ink from the nozzles based on the image data;
- recording means for recording the image, by using said record head, in a first recording mode in which recording is performed by using nozzles corresponding to a specific color out of the plurality of colors, or a second recording mode in which recording is performed by using nozzles corresponding to the plurality of colors;
- determination means for communicating with the external apparatus and determining whether the external apparatus has a capability of transmitting image data representing an image of a plurality of colors;
- setting means for setting a recording mode of said recording means to said first recording mode, when it is determined that the image data transmission apparatus does not have said capability; and idle discharge means for performing, at a predetermined timing during the recording operation performed by said recording control means, an idle discharge operation on only the nozzles corresponding to the specific color when said first recording mode is set by said setting means.

21. An image recording method for controlling an image recording apparatus to record an image on a recording medium based on image data sent from an external apparatus by using a record head having a plurality of nozzles which correspond to a plurality of colors, and performing a recording by discharging ink from the nozzles based on the image data, said method comprising:

a determining step of communicating with the external apparatus and determining whether the external apparatus has a capability of transmitting image data representing an image of a plurality of colors;

a setting step of setting a recording mode of the recording apparatus to a first recording mode in which recording is performed by using nozzles corresponding to a specific color out of the plurality of colors when it is determined in said determining step that the external apparatus does not have said capability; and an idle discharge step of performing, at a predetermined timing during the recording operation performed by said recording control means, an idle discharge operation on only the nozzles corresponding to the specific color when said first recording mode is set in said setting step.

* * * * *

UNITED STATES PATENT AND TRADEMARK OFFICE
CERTIFICATE OF CORRECTION

PATENT NO.    : 6,290,322 B1
DATED         : September 18, 2001
INVENTOR(S)   : Hiroyuki Noguchi et al.

It is certified that error appears in the above-identified patent and that said Letters Patent is hereby corrected as shown below:

Figure 9,
Change "DECORDER" to -- DECODER --.

Column 2,
Line 39, change "an" to -- a --; and
Line 57, change "unit" to -- unit 15 --.

Column 3,
Line 53, change "mount" to -- mounted --, and change "dismount" to -- dismounted --.

Column 6,
Line 23, change "move" to -- moves --.

Column 7,
Line 46, change "denotes" to -- denote --; and
Line 47, change "explained" to -- been explained --.

Column 8,
Line 36, change "step S100" to -- steps S100 --; and
Line 67, change "system," to -- systems, --.

Column 9,
Line 7, delete "of"; and
Line 65, change "stabled" to -- made stable --.

UNITED STATES PATENT AND TRADEMARK OFFICE
CERTIFICATE OF CORRECTION

PATENT NO. : 6,290,322 B1
DATED : September 18, 2001
INVENTOR(S) : Hiroyuki Noguchi et al.

It is certified that error appears in the above-identified patent and that said Letters Patent is hereby corrected as shown below:

Column 10,
Line 37, change "leader" to -- reader --.

Signed and Sealed this

Twelfth Day of March, 2002

Attest:

*Attesting Officer*

JAMES E. ROGAN
*Director of the United States Patent and Trademark Office*